US011377713B2

(12) United States Patent
Boshoff et al.

(10) Patent No.: US 11,377,713 B2
(45) Date of Patent: Jul. 5, 2022

(54) METHOD FOR RECOVERING AN ACID OR BASE

(71) Applicant: Paladin Intellectual Property Pty Ltd, Perth (AU)

(72) Inventors: Paul Boshoff, Perth (AU); Merrill Ford, Sydney (AU); Shana McDougall, Perth (AU); Mark Peacock, Perth (AU)

(73) Assignee: Paladin Intellectual Property Pty Ltd, Subiaco (AU)

( * ) Notice: Subject to any disclaimer, the term of this patent is extended or adjusted under 35 U.S.C. 154(b) by 14 days.

(21) Appl. No.: 16/948,465

(22) Filed: Sep. 19, 2020

(65) Prior Publication Data

US 2021/0140013 A1 May 13, 2021

Related U.S. Application Data

(62) Division of application No. 15/108,231, filed as application No. PCT/AU2014/000459 on Apr. 22, 2014, now Pat. No. 11,047,021.

(30) Foreign Application Priority Data

Apr. 17, 2014 (AU) ................ 2014901418

(51) Int. Cl.
*C22B 60/02* (2006.01)
*B01D 61/02* (2006.01)
(Continued)

(52) U.S. Cl.
CPC ...... *C22B 60/0252* (2013.01); *B01D 21/0024* (2013.01); *B01D 61/027* (2013.01);
(Continued)

(58) Field of Classification Search
None
See application file for complete search history.

(56) References Cited

U.S. PATENT DOCUMENTS 5,250,182 A    10/1993  Bento
5,501,798 A     3/1996  Al-Samadi
(Continued)

FOREIGN PATENT DOCUMENTS

WO    1999023263 A1    5/1999
WO    2004/106697 A1  12/2004
(Continued)

OTHER PUBLICATIONS

Keith Scott, Handbook of Industrial Membranes, First Edition, Elsevier Advanced Technology, 1995.
(Continued)

*Primary Examiner* — David C Mellon
(74) *Attorney, Agent, or Firm* — Oppedahl Patent Law Firm LLC (57) ABSTRACT

Disclosed herein is a method for recovering an acid or a base during a metal extraction process. The method comprises contacting a feed stream comprising the acid or base and the metal with an ultrafiltration membrane to produce an ultrafiltration retentate and an ultrafiltration permeate, and contacting the ultrafiltration permeate with a nanofiltration membrane. The nanofiltration retentate produced comprises a majority of the metal from the feed stream, and the nanofiltration permeate produced comprises a majority of the acid or base from the feed stream. Also disclosed herein is a recovery apparatus for recovering an acid or a base during a metal extraction process.

15 Claims, 1 Drawing Sheet

(51) Int. Cl.
*B01D 61/58* (2006.01)
*B01D 65/08* (2006.01)
*B01D 21/00* (2006.01)
*B01D 61/08* (2006.01)
*B01D 61/14* (2006.01)
*B01D 61/18* (2006.01)

(52) U.S. Cl.
CPC ........... *B01D 61/08* (2013.01); *B01D 61/145* (2013.01); *B01D 61/18* (2013.01); *B01D 61/58* (2013.01); *B01D 65/08* (2013.01); *C22B 60/0234* (2013.01); *C22B 60/0247* (2013.01); *B01D 61/14* (2013.01); *B01D 2311/04* (2013.01); *B01D 2311/10* (2013.01); *B01D 2311/14* (2013.01); *B01D 2317/025* (2013.01); *B01D 2317/04* (2013.01); *B01D 2317/06* (2013.01); *B01D 2317/08* (2013.01); *B01D 2321/02* (2013.01)

(56) References Cited

U.S. PATENT DOCUMENTS

| | | |
|---|---|---|
| 6,156,186 A | 12/2000 | Mueller et al. |
| 2011/0198285 A1 | 8/2011 | Wallace |
| 2012/0055875 A1 | 3/2012 | Lien |
| 2013/0264285 A1 | 10/2013 | Macintosh et al. |

FOREIGN PATENT DOCUMENTS

| | | |
|---|---|---|
| WO | WO-2012019274 A1 | 2/2012 |
| WO | 2012/156894 A2 | 11/2012 |
| WO | 2012156894 A2 | 11/2012 |

OTHER PUBLICATIONS

Rory Cameron, Chuck Edwards, Membrane technology application in mineral processing, 44th Annual Meeting of the Canadian Mineral Processors, 2012, Jan. 17, 2012, Ottawa, Ontario, Canada, The Institute of Mining, Metallurgy and Petroleum.
Wikipedia, https://en.wikipedia.org/wiki/Cross-flow_filtration, Cross-flow filtration, Mar. 1, 2014, via Wayback Machine at https://archive.org/web/.
Wikipedia, https://en.wikipedia.org/wiki/Ultrafiltration, Mar. 1, 2014, via Wayback Machine at https://archive.org/web/.
"Membrane technology applications in mineral processing"; R. Cameron et al., Proceedings of the 44th Annual Canadian Minreal Processors Conference, 2012 (See 3rd Party Observations).
"Nanofiltration—Principles and Applications", chapter 9, pp. 250 to 253, edited by A. I. Schäfer et al., 2005 (See 3rd Party Observations).
"Nanofiltration—Principles and Applications", chapter 19, pp. 459 to 477, edited by A. I. Schäfer et al., 2005 (See 3rd Party Observations).
"The Michelin uranium project, Labrador, Canada—Metallurgical testwork, economic sutides and process design", J. R. Goode et al., vol. 1, pp. 393 to 413, Proceedings of the 3rd International Conference on Uranium / 40th Annual Hydrometallurgy Meeting (Uranium 2010) (See 3rd Party Observations).
Third Party Observations in PCT/AU/2014/000459, submitted by Anonymous, Aug. 9, 2016.
International search report in international application No. PCT/AU2014/000459, dated Jun. 27, 2014.
International preliminary report on patentability in international application No. PCT/AU2014/000459, dated Aug. 26, 2015.

METHOD FOR RECOVERING AN ACID OR BASE

TECHNICAL FIELD

The present invention relates to method for recovering an acid or a base during a metal extraction process. In a particular form, the present invention relates to recovering an acid or base in a uranium extraction process.

BACKGROUND

Economically recovering valuable metals from ore containing the metal is an enduring challenge for the mining industry. For example, in the uranium mining industry, it is quite an involved process to extract uranium (mainly in the form of $U_3O_8$) from a uranium-containing ore. In brief, one process involves the ore first being crushed to a suitable size and then leached using sulphuric acid under oxidising conditions. After leaching, the solids and liquids can be separated, with the pregnant liquid being passed through an ion-exchange circuit where the uranium adsorbs (or is otherwise loaded) onto resin. Alternatively, an in-pulp process can be used to load the uranium onto the resin or an organic solvent used to extract the uranium. The loaded resin or solvent thus generated can be eluted with strong sulphuric acid to form a concentrated eluate, which is first treated to neutralise the acid then to precipitate the uranium. Such processes, however, require relatively large amounts of sulphuric acid (or other eluant), as well as relatively large amounts of a substance or substances for neutralising the sulphuric acid.

Increasing the efficiency of metal extraction processes (even if only slightly) can make such processes less resource intensive and/or increase the amount of valuable metal recovered and/or reduce the cost of metal extraction. This can provide potentially significant economic advantages, especially when many thousands of tonnes of ore are processed per day.

Numerous attempts have been made to increase the efficiency of metal extraction processes, some with more success than others. For example, attempts have been made to use nanofiltration techniques to recover and concentrate large ions (such as the uranyl sulphate ion) from an eluate during uranium extraction processes. In this respect, Goode and Brown (J. R. Goode and J. A. Brown, "The Michelin Uranium Project, Labrador, Canada Metallurgical Testwork, Economic Studies and Process Design", pages 393 to 413 of the Proceedings of the $3^{rd}$ International Conference on Uranium) describe pilot scale tests using nanofiltration to upgrade a uranium-containing eluate. While these pilot scale tests showed promise in the laboratory (where variables such as the amount of suspended solids, contaminants, etc. were controlled), it is well appreciated by those skilled in the art, laboratory-scale experiments which successfully trial particular techniques are in no way indicative that such techniques will work in a full-scale mine. In reality, many factors can influence the effectiveness of a particular technique and the only way to determine whether the technique will be appropriate is to test it under the actual conditions that will be experienced in the mine. The inventors of the invention the subject of the present application have found that the nanofiltration techniques proposed by Goode and Brown simply do not work in an actual mine environment, for reasons including that the suspended solids in the uranium loaded eluate rapidly clog the nanofiltration membrane.

It would be advantageous to provide a metal extraction process in which an acid or base can be recovered from an acid or base loaded with the metal.

SUMMARY OF INVENTION

In a first aspect, the present invention provides a method for recovering an acid or a base during a metal extraction process. The method comprises contacting a feed stream comprising the acid or base and the metal with an ultrafiltration membrane to produce an ultrafiltration retentate and an ultrafiltration permeate, and contacting the ultrafiltration permeate with a nanofiltration membrane to produce a nanofiltration retentate and a nanofiltration permeate. The nanofiltration retentate comprises a majority of the metal from the feed stream, and the nanofiltration permeate comprises a majority of the acid or base from the feed stream.

The inventors have unexpectedly found that a combination of ultrafiltration and nanofiltration can be used to recover an acid or a base during a full-scale metal extraction process even when there are suspended solids. After extensive trials by the inventors, they realised that nanofiltration techniques could, in fact, be used during metal extraction processes in an actual mine, but only if the feed stream for the nanofiltration membrane was sufficiently clean and, in particular, free of suspended solids. The inventors discovered that pre-processing the feed stream using an ultrafiltration membrane enabled the nanofiltration membrane to work effectively.

The inventors have found that incorporating the process of the present invention into a metal extraction process can provide a number of advantages over existing processes. For example, less neutralising agents are required to neutralise the metal-containing nanofiltration retentate and the metal is more concentrated in the nanofiltration retentate than in the concentrated eluate produced via existing processes. Further the utility of the nanofiltration membrane becomes practical without premature failure of the membrane and or clogging. As will be appreciated, incorporating the process of the present invention into a metal extraction process can increase the overall efficiency of the metal extraction process due to the ability to recover the acid or base.

In some embodiments, at least a portion of the acid or base from the nanofiltration permeate can be re-used in an upstream step of the metal extraction process, which can effectively enable the acid or base to be recycled, thus decreasing the overall demand for the acid or base in the metal extraction process. This also has the advantage of limiting any loss of metal which may be in the nanofiltration permeate as it is returned to the process.

In some embodiments, the feed stream is an eluate. The eluate may, for example be the eluate formed by passing the acid or base through a contactor, such as a column, containing resin loaded with the metal. The acid or base removes the metal from the resin thereby forming the eluate. In embodiments where the acid or base is being recycled, the acid or base that is passed through the contactor may comprise (or consist of) the acid or base from the nanofiltration permeate so reducing the demand for new reagent.

In some embodiments, the feed stream may be directed onto the ultrafiltration membrane such that any accumulated material on the ultrafiltration membrane is continually scoured off the ultrafiltration membrane by the feed stream. The feed stream may, for example, be directed onto the ultrafiltration membrane at an obtuse angle, or in a direction substantially parallel to the membrane (ie in a cross-flow configuration).

In some embodiments, the ultrafiltration permeate may be directed onto the nanofiltration membrane such that any accumulated material on the nanofiltration membrane is scoured off the nanofiltration membrane by the ultrafiltration permeate. The ultrafiltration permeate may, for example, be directed onto the nanofiltration membrane at an obtuse angle, or in a direction substantially parallel to the membrane (ie in a cross-flow configuration).

In some embodiments, the ultrafiltration membrane and/or nanofiltration membrane may be flushed at intervals. The ultrafiltration membrane and nanofiltration membrane may, for example, be flushed using a membrane cleaning fluid. Alternatively, the ultrafiltration membrane and nanofiltration membrane may be flushed using another fluid, for example, the ultrafiltration permeate, but only in an upstream side of the nanofiltration membrane.

In some embodiments, contacting the feed stream with the ultrafiltration membrane comprises splitting the feed stream for contacting a plurality of ultrafiltration membranes (e.g. 2, 3, 4 or more ultrafiltration membranes in parallel and/or series configuration.

In some embodiments, contacting the ultrafiltration permeate with the nanofiltration membrane comprises splitting the ultrafiltration permeate for contacting a plurality of nanofiltration membranes (e.g. 2, 3, 4 or more nanofiltration membranes in parallel and/or series configuration).

In some embodiments, at least a portion of the ultrafiltration retentate is retained for use in an upstream step of the metal extraction process (e.g. being directed back into a solids removal device positioned upstream of the ultrafiltration membrane). In some embodiments, at least a portion of the ultrafiltration permeate is retained for use in an upstream step of the metal extraction process (e.g. directed back onto the ultrafiltration membrane). In this manner any of the metal which may be in the ultrafiltration retentate is fed back into the process, further increasing its efficiency.

In some embodiments, the feed stream is processed with a solids removal device before passing the feed stream through the ultrafiltration membrane. In an embodiment the solids removal device removes solids that would otherwise be detrimental to the ultrafiltration membrane. In an embodiment the detrimental solids removed by the solids removal device are coarse solids relative to any solids entrained in the feed stream contacted with the ultrafiltration membrane. The solids removal device may, for example, be a clarifier, a settler, a filter or a centrifuge. In some embodiments, the ultrafiltration retentate may be recycled into the feed stream in the solids removal device, whereby any of the metal contained in the ultrafiltration retentate is effectively recycled back into the feed stream. A secondary consequence of including the solids removal device is to bleed detrimental solids (and some unavoidable metal-containing liquor) from the feed stream to the ultrafiltration membrane. This slurry can be recycled in an upstream step of the metal extraction process to recover the metal in the liquor contained in the slurry bleed stream.

In a second aspect, the present invention provides a recovery apparatus for recovering an acid or a base during a metal extraction process. The apparatus comprises an ultrafiltration membrane onto which a feed stream comprising the acid or base and the metal is receivable to produce an ultrafiltration retentate and an ultrafiltration permeate, and a nanofiltration membrane onto which the ultrafiltration permeate is receivable to produce a nanofiltration retentate and a nanofiltration permeate. The nanofiltration retentate comprises a majority of the metal from the feed stream, and the nanofiltration permeate comprises a majority of the acid or base from the feed stream.

In some embodiments, the recovery apparatus further comprises an acid or base feedback conduit via which at least a portion of the acid or base from the nanofiltration permeate is recyclable into an upstream step of the metal extraction process.

In some embodiments, the recovery apparatus further comprises an ultrafiltration retentate feedback conduit via which at least a portion of the ultrafiltration retentate is recyclable into an upstream step of the metal extraction process.

In some embodiments, the recovery apparatus further comprises an ultrafiltration permeate feedback conduit via which at least a portion of the ultrafiltration permeate is recyclable into an upstream step of the metal extraction process. The ultrafiltration permeate feedback conduit may, for example, direct the at least a portion of the ultrafiltration permeate back onto the ultrafiltration membrane (e.g. in a cross-flow direction to further help scour the membrane surface).

In some embodiments, the feed stream is directed onto the ultrafiltration membrane such that any accumulated material on the ultrafiltration membrane is continually scoured off the ultrafiltration membrane by the feed stream. In some embodiments, the ultrafiltration permeate is directed onto the nanofiltration membrane such that any accumulated material on the nanofiltration membrane is scoured off the nanofiltration membrane by the ultrafiltration permeate.

In some embodiments, the recovery apparatus further comprises a cleaner for flushing the ultrafiltration membrane and nanofiltration membrane (e.g. at periodic intervals or when data from the system indicates that one or both of the membranes need to be cleaned).

In some embodiments, the recovery apparatus comprises a plurality of ultrafiltration membranes onto which the feed stream comprising the acid or base and the metal is receivable. In some embodiments, the recovery apparatus comprises a plurality of nanofiltration membranes onto which the ultrafiltration permeate is receivable. The plurality of ultrafiltration membranes may, for example, comprise two, three, four or more ultrafiltration membranes in parallel and/or series configuration. The plurality of nanofiltration membranes may, for example, comprise two, three, four or more nanofiltration membranes in parallel and/or series configuration.

In some embodiments, the recovery apparatus further comprises a solids removal device for removing coarse solids from the feed stream before the feed stream is received by the ultrafiltration membrane. The solids removal device may, for example, be a clarifier, a settler, a filter or a centrifuge. The recovery apparatus may, in such embodiments, comprise a conduit for carrying at least a portion of the ultrafiltration retentate to the solids removal device.

In some embodiments, the ultrafiltration membrane or ultrafiltration membranes is/are provided as a discrete unit comprising a feed stream input conduit, an ultrafiltration retentate output conduit and an ultrafiltration permeate output conduit.

In some embodiments, the nanofiltration membrane or nanofiltration membranes is/are provided as a discrete unit comprising an ultrafiltration permeate input conduit, a nanofiltration retentate output conduit and a nanofiltration permeate output conduit.

BRIEF DESCRIPTION OF DRAWINGS

A specific embodiment of the present invention will now be described, by way of example only, with reference to the following drawing, in which.

DESCRIPTION OF EMBODIMENTS

In a first aspect, the present invention provides a method for recovering an acid or a base during a metal extraction process. The method comprises contacting a feed stream comprising the acid or base and the metal with an ultrafiltration membrane to produce an ultrafiltration retentate (i.e. the portion of the feed stream which does not pass through the ultrafiltration membrane) and an ultrafiltration permeate (i.e. the portion of the feed stream which passes through the ultrafiltration membrane). The ultrafiltration permeate is then contacted with a nanofiltration membrane to produce a nanofiltration retentate and a nanofiltration permeate. The nanofiltration retentate (i.e. the portion of the ultrafiltration permeate which does not pass through the nanofiltration membrane) comprises a majority of the metal from the feed stream, and the nanofiltration permeate (i.e. the portion of the ultrafiltration permeate which passes through the nanofiltration membrane) comprises a majority of the acid or base from the feed stream.

In a second aspect, the present invention provides a recovery apparatus for recovering an acid or a base during a metal extraction process. The apparatus comprises an ultrafiltration membrane onto which a feed stream comprising the acid or base and the metal is receivable to produce an ultrafiltration retentate and an ultrafiltration permeate, and a nanofiltration membrane onto which the ultrafiltration permeate is receivable to produce a nanofiltration retentate and a nanofiltration permeate. The nanofiltration retentate comprises a majority of the metal from the feed stream, and the nanofiltration permeate comprises a majority of the acid or base from the feed stream.

The present invention may be utilised in any process where a metal-containing ore is processed using an acid or a base in order to recover the metal in a form suitable for use in subsequent applications. As will be appreciated, the acid or base recovered will depend on the metal (or metals) being extracted, as well as the process that is being used to extract the metal(s). For example, as discussed above, uranium can be extracted from uranium-containing ore using sulphuric acid. However, using different techniques, uranium can be extracted from uranium-containing ore under basic conditions, which are obtained via processes using bases such as sodium carbonate or sodium bicarbonate (or mixtures thereof).

Thus, the present invention can be used, for example, to recover mineral acids. The mineral acids may be selected from the group consisting of sulphuric acid, nitric acid, phosphoric acid and hydrochloric acid. The present invention can be used, for example, to recover bases selected from the group consisting of sodium carbonate, sodium bicarbonate and sodium hydroxide (or mixtures thereof).

The present invention can be utilised to recover an acid or a base during a process in which a soluble metal compound is extracted. For example the present invention can be utilised to recover an acid or a base during a process in which a metal selected from the following group is extracted: uranium, nickel, copper, zinc, gold, silver, platinum group metals, rare earth elements, vanadium, tantalum, niobium, and tungsten. It is within the ability of those skilled in the art to determine at what stage of the metal extraction process the steps of the present invention should be carried out.

Feed Stream

The feed stream includes the acid or base and the metal, and is in a form suitable to be received on an ultrafiltration membrane. It is expected that the acid or base and metal is dissolved in the feed stream. In some embodiments, it may be necessary to include a preliminary step in which coarse particles are removed before the feed stream reaches the ultrafiltration membrane, for example by using a solids removal device (SRD), as discussed below. In some cases precursory steps in the process of production of the feed stream will involve a form of solids removal or clarification such that the feed stream is of a suitable quality. For example a preliminary step may comprise clarification prior to a solvent extraction step, with a raffinate of the solvent extraction step becoming the feed stream that is then contacted with the ultrafiltration membrane. Other alternative or additional preliminary steps may exist between the solids removal step and the ultrafiltration of the feed stream step, depending on the metal being extracted and the process used for such metal extraction. However, in some circumstances, the feed stream may be of a quality where such pre-treatment is not necessary.

In some embodiments, the feed stream may contain or be an eluate from an earlier stage of the metal extraction process. For example, many processes use ion exchange resins (or the like) to isolate a metal from a solution (or suspension, etc.) containing the metal. The loaded resin is subsequently eluted with a suitable eluant to produce the eluate containing the metal. In some embodiments, the eluant may be the acid or base which is subsequently recovered via the present invention (e.g. the eluate is formed by passing the acid or base through a contactor or column that contains the resin onto which the metal has been loaded). In other embodiments, however, the eluant may be a different substance, with the acid or base recovered in the present invention being in the feed stream because of an upstream step of the metal extraction process (or a downstream step, but one which is upstream of the ultrafiltration membrane).

In some embodiments (discussed further below), the eluant comprises the acid or base from the nanofiltration permeate. In some embodiments (also discussed further below), the eluant consists essentially of the acid or base from the nanofiltration permeate. In such embodiments, the recovery apparatus of the present invention may also have an acid or base feedback conduit via which at least a portion (preferably all) of the acid or base from the nanofiltration permeate is recyclable into an upstream step of the metal extraction process.

Ultrafiltration

In the present invention, the feed stream comprising the acid or base and the metal is contacted with an ultrafiltration membrane to produce an ultrafiltration retentate and an ultrafiltration permeate.

Ultrafiltration membranes are membranes where forces like pressure or concentration gradients lead to a separation of components in the feed stream through a semipermeable membrane. Suspended solids and solutes of high molecular weight are retained in the retentate (i.e. they do not pass through the membrane), while water and low molecular weight solutes pass through the membrane in the permeate. Some properties of an ultrafiltration membrane are defined by its molecular weight cut off (MWCO) The choice of ultrafiltration membrane will depend on its intended application, and will be influenced by factors such as the metal species to be allowed to pass, pH of the feed stream, and physical characteristics of the feed stream, such as the amount of dissolved solids, temperature of the feed stream, viscosity of the feed stream etc. It is within the ability of a person skilled in the art to select a suitable ultrafiltration membrane for specific applications.

Examples of ultrafiltration membranes that would be suitable for use in the present invention include the following commercially available ultrafiltration modules: IMT 10060 UF/MB/G, IMT 10060 UF/SB/1.5, Hydranautics HYDRAcap 60 or INGE Dizzer® XL 1.5 MB 40.

The ultrafiltration membranes will require associated components such as an appropriate housing, and piping for directing the feed stream onto the membrane, and for receiving and appropriately directing the ultrafiltration retentate and permeate. Such associated components are well known to those of skill in the art, and examples are given below in the context of a specific embodiment.

The number of ultrafiltration membranes in the present invention will depend on factors such as the flow rate of the feed stream, capacity of the membranes and propensity of fouling to occur. Typically, due to the relatively large size of mining operations, more than one ultrafiltration membrane would be used in the present invention. In such embodiments, contacting the feed stream with the ultrafiltration membrane may comprise splitting the feed stream for contacting a plurality (e.g. 2, 3, 4 or more) of ultrafiltration membranes arranged in parallel. In some embodiments, however, it may be necessary or advantageous to provide two or more ultrafiltration membranes in series and/or parallel configuration.

In some embodiments, the ultrafiltration membrane or membranes is/are provided as a discrete unit comprising a feed stream input conduit, an ultrafiltration retentate output conduit and an ultrafiltration permeate output conduit. Such a discrete unit vastly simplifies the construction of a recovery apparatus of the present invention.

In some embodiments, fouling of the ultrafiltration membrane(s) may be of concern. For example, if the feed stream contains a relatively high amount of particulate or suspended solids, the solids would be expected to foul the membrane relatively quickly. In such embodiments, actions may be taken to prevent, or at least delay, fouling of the membrane. For example, in some embodiments, the feed stream can be directed onto the ultrafiltration membrane such that any accumulated material on the ultrafiltration membrane is continually scoured off the ultrafiltration membrane by the feed stream. For example, the feed stream could be directed onto the ultrafiltration membrane at an obtuse angle or in a direction substantially parallel to the membrane (i.e. in a cross-flow configuration). Alternatively (or in addition), a liquid could be caused to flow across the surface of the membrane, either continuously or periodically. Alternatively (or in addition), periodic back-flushing of the membranes could be performed. The liquids used to perform these cleaning operations may (as is discussed in further detail below) be a liquid that is obtained during the present invention (e.g. the ultrafiltration membrane can be cleaned using a portion of the ultrafiltration permeate). In an embodiment there may be two modes of ultrafiltration membrane cleaning. The first mode is relatively frequent, whereby the ultrafiltration permeate is back-flushed through the membrane. The second mode is performed when the first mode fails to improve ultrafiltration membrane performance to a satisfactory level. In the second mode, which is performed relatively infrequently, a dedicated cleaning fluid, such as a caustic fluid is exposed to both sides of the membrane, performs a chemical clean (rather than a physical clean).

The preferred or optimal operating conditions of the ultrafiltration membrane will depend on a number of factors, such as the temperature, pressure, cross-flow velocity, cleaning cycles, etc.) of the membrane. It is within the ability of those skilled in the art to establish the optimal operating conditions for a particular membrane in accordance with the present invention. By way of example, however, in a method for recovering sulphuric acid from a uranium extraction process, the ultrafiltration membranes can be operated under one or more of the following conditions: temperature 10° C. to 60° C. (preferably 30° C. to 50° C.), pressure maximum 750 kPa (preferably 50 kPa to 700 kPa), transmembrane pressure differential up to 250 kPa (preferably 50 kPa to 200 kPa), flux 10 LMH to 80 LMH (preferably 20 LHM to 40 LMH), a feed flow rate of 0.1 kL/h to 2 kL/h per membrane (preferably 0.5 kL/h to 1.5 kL/h) and a permeate flow rate of 0.1 kL/h to 2 kL/h (preferably 0.5 kL/h to 1.5 kL/h).

These conditions may vary according to the ultrafiltration membrane used and other factors in the metal extraction process.

Once the feed stream comprising the acid or base and the metal contacts the ultrafiltration membrane, it is split into an ultrafiltration retentate and an ultrafiltration permeate. Piping provided in the recovery apparatus of the present invention is adapted to receive the ultrafiltration retentate and permeate from the opposite sides of the membrane and appropriately direct the respective streams.

The ultrafiltration retentate may be discarded, but is more typically retained for beneficial use in the metal extraction process. In such embodiments, the recovery apparatus may have an ultrafiltration retentate feedback conduit, via which at least a portion of the ultrafiltration retentate is recyclable into an upstream step of the metal extraction process. In some embodiments, for example, the ultrafiltration retentate may be recycled into an input stream to the SRD. A particular advantage in recycling the ultrafiltration retentate into the SRD is that any metal in the ultrafiltration retentate is fed back into and hence is retained in the extraction process. Further the flow rate of the input stream into the SRD can be largely balanced against the nanofiltration retentate and permeate, along with the SRD waste solids, as outputs of the process. This can allow circulation within the process of the present invention, for example for anti-fouling purposes, and for the opportunity for wastes that were not extracted in one settling cycle of the SRD to still be extracted as part of the SRD's solid wastes in subsequent cycles.

The ultrafiltration permeate contains the acid or base and the metal, and is directed towards the nanofiltration membrane. In some embodiments, all of the ultrafiltration permeate is directed to the nanofiltration membrane. In alternate embodiments, however, the flow of the ultrafiltration membrane may be engineered such that it is greater than that of the nanofiltration membrane, with a portion of the ultrafiltration permeate therefore being available for use in an upstream step of the metal extraction process (e.g. for back-flushing the ultrafiltration or nanofiltration membranes). In such embodiments, the recovery apparatus of the present invention may also have an ultrafiltration permeate feedback conduit.

Nanofiltration

In the present invention, the ultrafiltration permeate (containing acid or base and metal from the feed stream) is caused to contact the nanofiltration membrane, with the nanofiltration retentate comprising a majority of the metal from the feed stream, and the nanofiltration permeate comprising a majority of the acid or base from the feed stream.

Nanofiltration membranes are membranes which, when pressure is applied, can be used to separate soluble ions from water (or other solvents). Nanofiltration spans between reverse osmosis and ultrafiltration (in terms of separation size) and generally covers MWCO values of 100 to 1000 Daltons.

The choice of nanofiltration membrane will depend on its intended application, and will be influenced by factors such as the metal species to be allowed to pass, pH of the feed stream, concentration of all other species in the feed stream, operating temperature and pressure. It is within the ability of a person skilled in the art to select a suitable nanofiltration membrane for specific applications.

Examples of nanofiltration membranes that would be suitable for use in the present invention include the following commercially available nanofiltration elements arranged within a suitable housing: GE DK, AMS Nano-Pro A-3012-8040, BMS Membranes ARU-28 or BMS Membranes ARU-24.

The nanofiltration membranes will require associated components such as an appropriate housing, and piping for directing the feed stream onto the membrane, and for receiving and appropriately directing the nanofiltration retentate and permeate. Such associated components are well known to those of skill in the art, and examples are given below in the context of a preferred embodiment.

The number of nanofiltration membranes in the present invention will depend on factors such as the flow rate of the ultrafiltration permeate, capacity of the membranes and propensity of fouling to occur. Typically, due to the relatively large size of mining operations, more than one nanofiltration membrane would be used in the present invention. In such embodiments, the ultrafiltration permeate may be split and directed towards a plurality of nanofiltration membranes. The present invention may, for example, involve splitting the ultrafiltration permeate such that substantially equal flows make contact with a plurality (e.g. 2, 3, 4 or more) of nanofiltration membranes arranged in parallel. In some embodiments, however, it may be necessary or advantageous to provide two or more nanofiltration membranes in series.

The nanofiltration membrane or nanofiltration membranes may, in some embodiments, be provided as a discrete unit comprising an ultrafiltration permeate input conduit, a nanofiltration retentate output conduit and a nanofiltration permeate output conduit. As noted above, such a discrete unit vastly simplifies the construction of a recovery apparatus of the present invention.

The ultrafiltration permeate is directed such that it makes contact with the nanofiltration membrane, whereby the permeate can pass through the membrane. The nanofiltration membrane is operated in a cross-flow configuration. In some embodiments, however, fouling of the nanofiltration membrane may be of concern. In such embodiments, actions may be taken to prevent, or at least delay, fouling of the membrane. For example, the cross-flow velocity is controlled to reduce fouling.

Other membrane cleaning techniques may be used to clean the membrane. For example, a specific cleaning fluid may be directed onto the membrane surface (e.g. whilst the metal extraction process is stopped) to clean the surface, such as in a fast forward flush operation. Alternatively (or in addition), the upstream side of the nanofiltration membrane could be cleaned using a portion of the ultrafiltration permeate.

The preferred or optimal operating conditions of the nanofiltration membrane will depend on a number of factors, such as the temperature, pressure, cross-flow velocity, pH, the dissolved solids in the ultrafiltration permeate, zeta potential, cleaning cycles, etc. of the membrane. It is within the ability of those skilled in the art to establish the optimal operating conditions for a particular membrane in accordance with the present invention.

There may be more than one nanofiltration membrane configured to receive the ultrafiltration permeate so as to pass across the membranes in parallel. Alternatively or in addition there may be more than one nanofiltration membrane configured in series. In a series configuration, each membrane (or a bank of membranes in a parallel configuration) in the series is referred to as a stage. Each stage produces a stage permeate and a stage retentate. Each stage retentate proceeds to the next stage in the series. The stage permeates are piped to a common header to form a composite permeate. The nanofiltration retentate is the stage retentate produced by the final stage in the series.

By way of example, however, in a method for recovering sulphuric acid from a uranium extraction process, the nanofiltration membranes can be operated under one or more of the following conditions: temperature 10° C. to 60° C. (preferably 35° C. to 50° C.), a maximum pressure 7000 kPa (preferably a pressure of 2000 kPa to 4000 kPa), a membrane pressure differential up to 50 kPa (preferably 10 kPa to 30 kPa), and a flux of 2 LMH to 34 LMH (preferably 5 LMH to 20 LMH).

These conditions may vary according to the nanofiltration membrane used and or other factors in the metal extraction process.

The nanofiltration retentate contains the majority of the metal from the feed stream, and a much reduced amount of the acid or base. As such, much less neutralising agent is required to neutralise the retentate than would be required for, say, a process where the metal was present in a concentrated eluate. The metal in the nanofiltration retentate is also usually more concentrated than in the feed stream, thereby making it easier to cause the metal to precipitate and recover.

The nanofiltration permeate contains the majority of the acid or base from the feed stream, but very little of the metal. The permeate may be discarded, but is more typically retained for beneficial use in the metal extraction process. In some embodiments, at least a portion of the acid or base from the nanofiltration permeate (or the nanofiltration permeate in its entirety) may be beneficially re-used in an upstream step of the metal extraction process. For example, the acid or base from the nanofiltration permeate (or the nanofiltration permeate in its entirety) may be used as the eluant for recovering the metal adsorbed on an ion-exchange resin during the earlier stage of the metal extraction process. In this manner, any of the metal which may be present in the nanofiltration permeate may be recovered because it passes through the recovery process again.

Other Components

In some embodiments, the recovery apparatus and method of the present invention may have additional components or involve additional steps to those discussed above. Some of these components (e.g. piping for directing the respective streams, pressure forming and pumping apparatus, housings for the components, etc.) will be understood by those skilled in the art to be inherent to apparatus and processes using ultrafiltration and nanofiltration membranes in a metal extraction processes, and need not be generally discussed.

In some embodiments, the recovery apparatus may also have a cleaner for flushing the ultrafiltration membrane and nanofiltration membrane at intervals. The cleaner may be adapted to flush the membranes with a cleaning fluid, or one of the flow streams produced during the present invention. The cleaner may be adapted to clean an upstream and/or downstream side of the membranes. The cleaner may be actuated at periodic intervals, or when data measured from the process (e.g. pressure drop across the membranes) indicates that cleaning may be necessary.

The ultrafiltration membrane and nanofiltration membrane may be cleaned by flushing the membrane with a cleaning fluid. In some embodiments, it may be necessary to isolate the membranes from the metal extraction process whilst the cleaning operations are carried out, but this may not be necessary in all cases.

In some embodiments, the recovery apparatus may also have a SRD for removing coarse solids from the feed stream before the feed stream is received by the ultrafiltration membrane, and the method includes the step of removing coarse solids from the feed stream before passing the feed stream through the ultrafiltration membrane. In some embodiments, the SRD is a clarifier, a settler, a filter or a centrifuge, but any method or apparatus that can be used to clarify a solution to be suitable for ultrafiltration may be used in the present invention.

As noted above, in some embodiments, the recovery apparatus may have a SRD conduit for carrying at least a portion of the ultrafiltration retentate to the SRD. Returning the ultrafiltration retentate to the SRD allows further solids to be separated and returns metal in ultrafiltration retentate to the process.

EXAMPLE EMBODIMENT

Figure 1:
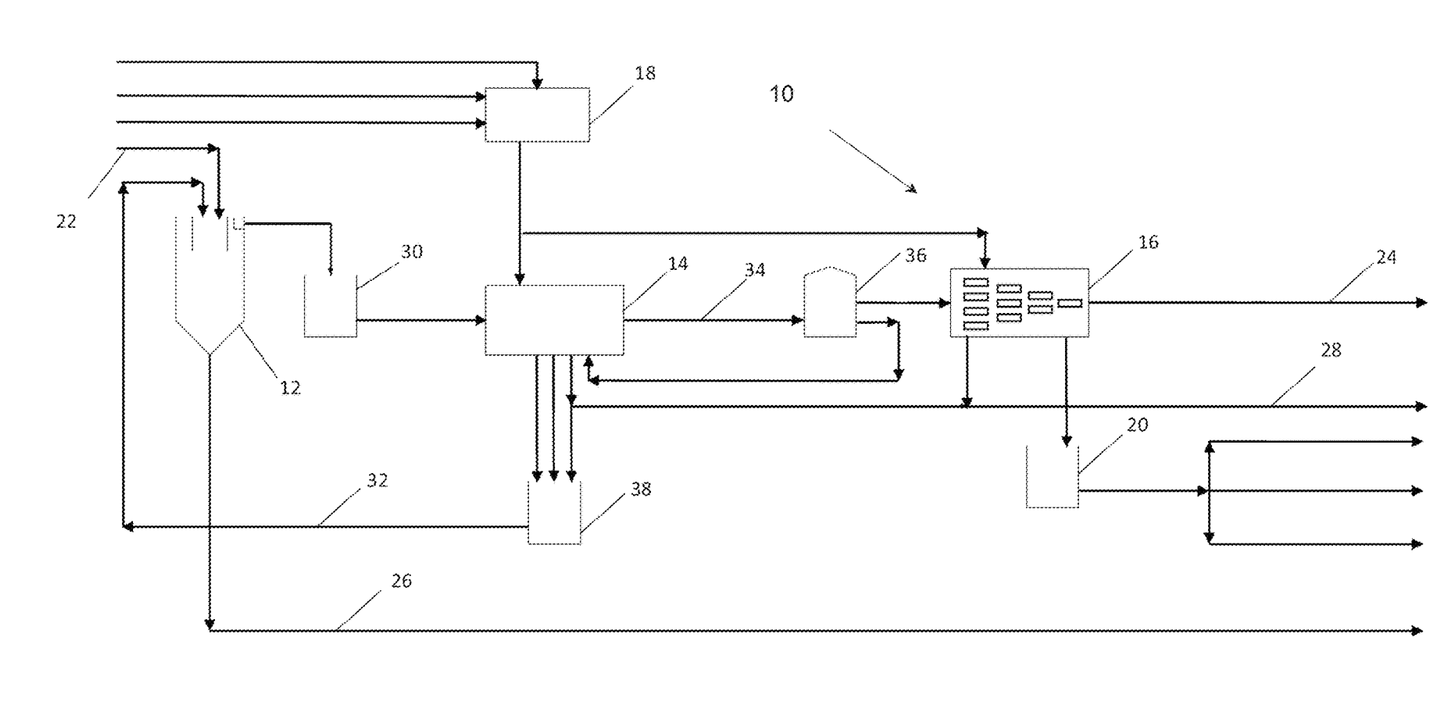
FIG. 1 is a process diagram showing a process in accordance with an embodiment of the present invention for recovering an acid or a base during a uranium extraction process.

A specific embodiment of the present invention will now be described with reference to FIG. 1, which is a flow diagram for an acid recovery plant 10 having a settler 12, ultrafiltration membranes in a UF (ultrafiltration) plant 14, nanofiltration membranes in a NF (nanofiltration) plant 16, and a cleaner in a CIP (clean in place) skid 18. Plant 10 is used to recover sulphuric acid 20 from a concentrated eluate (CE) stream 22 formed during a uranium extraction process (the upstream steps in this process are not included in the flow diagram of FIG. 1) when sulphuric acid is used to elute uranium species adsorbed on an ion-exchange resin. The clean acid 20 is recovered prior to neutralisation of the uranium containing solution 24, and is suitable for reuse.

The plants 14, 16 and skid 18 may be provided as discrete units in order for the plant 10 to be substantially modular, thus enabling it to be relatively easily moved and adapted for the specific requirements of any given metal extraction process. The plants 14, 16 and skid 18 are located at the uranium-ore processing site.

The plant 10 is controlled by a Programmable Logic Controller (PLC). The plant 10 also has ancillary components (described below) including intermediate tanks, pumps and instruments (not shown).

The concentrated eluate feed stream 22 passes through the plant 10 to result in a clean acid stream 20 and a concentrated uranium stream 24. Two minor streams are also produced; the settler underflow 26, which contains coarse solids removed from the feed stream, and the CIP waste stream 28.

Each of the components of plant 10 are described in turn below in the context of a pilot plant that has been assembled to recover sulphuric acid from a uranium extraction process.

Settler

The settler 12 is a SRD and has an internal launder to overflow into the UF feed tank 30. The CE feed line 22 and UF return tank line 32 flow into the feedwell, with an airbreak ensuring no return flow. The overflow from the settler 12 gravity flows to the UF feed tank 30.

The settler 12 is drained of slurry periodically under gravity to maintain a consistent sludge level in the settler. The underflow discharge 26 is monitored by a density meter and flow meter with the discharge draining to a re-pulp tank (not shown). The underflow from the settler 12 is pumped to an upstream location in the extraction process. This allows metal-containing liquor in the underflow to be recycled.

UF Plant

The UF plant 14 removes fine suspended solids from the CE feed by exposing the fluid to UF membranes, producing a CE fluid permeate 34 suitable for NF treatment. The CE fluid from the UF feed tank 30 is pumped through the UF plant 14, with the filtered CE fluid (UF permeate) 34 flowing to the NF feed tank 36. A large proportion of the permeate flow 34 is recirculated within the UF plant 14 to maintain adequate cross-flow velocity through the UF membranes, while a small retentate flow is directed to the UF return tank 38 (and hence back to the settler 12 via the UF return tank line 32).

The UF plant 14 undergoes periodic back-flushing for the purpose of cleaning the membranes. The back-flush is fed from the NF feed tank 36, with all fluid returning to the UF return tank 38. All fluid in the UF return tank 38 is pumped at a consistent rate back to the settler 12.

The UF plant 14 uses 32 UF membranes in a parallel configuration.

NF Plant

The NF plant 16 consists of two pumps and four stages of membrane filtration utilising 10 NF membrane housings in a 4-3-2-1 tapered array configuration to recover clean acid 20 with a low uranium content from the UF permeate 34. Each NF membrane housing comprises six nanofiltration elements, although another number of elements in each housing is possible. The UF permeate from the NF feed tank 36 is pumped through the NF plant 16 to generate the permeate and retentate streams. The permeate from the NF plant 16 flows to the recovered acid tank 20 while the retentate 24 (containing the majority of the uranium) flows to an acid neutralisation circuit (not shown) for recovery of the uranium from the retentate 24.

CIP Plant

The UF and NF plant membranes are cleaned in place (CIP) by a sequence of flushing and circulation of cleaning fluids through the membranes. The CIP skid 18 has tanks and dedicated pumps to flush and circulate cleaning fluids to the UF plant 14 and NF plant 16.

The chemical solution from the CIP tank 18 is circulated through the membrane plant and returned to the CIP chemical tank. The CIP water tank and CIP acid tank will allow flushing of the UF and NF plants. All the flushing and cleaning fluids are recovered to tanks for re-use and/or disposal.

The plant capacity and operation parameters of plant 10 will now be described. Listed below are key parameters that were used to design the plant 10.

|  | Units | Design Min | Design Operating | Design Max |
|---|---|---|---|---|
| Settler 12 | | | | |
| CE Feed | kL/h | 25.5 | 30 | 35 |
| UF Return Flow | kL/h | 24 | 24 | 30 |

-continued

|  | Units | Design Min | Design Operating | Design Max |
|---|---|---|---|---|
| UF plant 14 | | | | |
| Feed | kL/h | 50 | 54 | 65 |
| Recovery | % | 70 | 75 | 85 |
| Flux | LMH (L/m²/h) | n/a | 33 | n/a |
| NF plant 16 | | | | |
| CE Feed | kL/h | 25.5 | 30 | 35 |
| Volumetric Recovery | % | 65 | 70 | 85 |
| Flux | LMH (L/m²/h) | 20 | 30 | 40 |

The operational range of a membrane plant is mechanically restricted by flow and pressure derived from membrane limitations. The plant is further safeguarded to operate within mechanical limits by Supervisory Control and Data Acquisition (SCADA) interlocks if unsuitable combinations of control parameters are utilised or process parameters exceed safe limits.

The membrane plant skid is designed to operate at its target design parameters, but there is flexibility around these values. As one moves further away from the design parameters, the flexibility of the individual values is reduced (i.e. while it may be achievable to have one parameter at the extreme of its range, it is simply not possible to achieve all other parameters without compromising plant performance). Additionally, the physical and chemical characteristics of the CE feed fluid in the feed stream 22 has a significant influence on overall plant performance.

Overall, the plant 10 has a CE feed flow in the feed stream 22 ranging from 20 kL/h to 40 kL/h, and a volumetric recovery range of 55% to 85%. While the plant 10 has flexibility to operate within these ranges, there are restrictions on what is hydraulically achievable, with CE feed composition having an effect on the operating range.

Settler

Settler Feed Rate
  Design: 54 kL/h

The settler 12 is an overflow tank and has no mechanical restriction on inlet or outlet flows, apart from feed pump capacity. Settler feed flow in the feed stream 22 consists of the CE "fresh" feed at 30 kL/h and 24 kL/h of return flow from the UF return tank 38, totalling 54 kL/h. The design flow of 54 kL/h provides a nominal residence time in the settler 12 of 1 hour. Lower flows increase the residence time, which improves the overflow clarity.

Having high feed rates, or widely varying feed rates, results in poor overflow clarity, resulting in a higher solids load on the UF plant 14.

UF Plant

UF Plant Total Feed Flow
  Design: 54 kL/h
  Range: 20 kL/h to 110 kL/h (limited by UF feed pump)

The UF plant 14 receives feed from the settler 12. In this embodiment there are 32 membranes arranged in a parallel configuration. The type of UF membranes used is a capillary PES, such as INGE Dizzer® XL 1.5 MB 40, which are piped in a cross-flow inside-out configuration. While this design value is 54 kL/h, the maximum value is limited by the allowable membrane pressure drop and trans-membrane pressure and/or the UF feed pump hydraulic capability. Based on the UF membrane specifications (maximum permeate flow rate of 3.2 kL/h per membrane) and with 32 installed membranes at 75% recovery, the UF plant 14 can support a feed flow of 136 kL/h. However, the UF feed pump has a maximum flow 110 kL/h, and thus cannot exceed the maximum feed rate of the membranes.

UF Return Flow
  Design: 24 kL/hl
  Range: 15 kL/h to 55 kL/h (limited by UF return pump)

While the design flow to the settler 12 from the UF return pump is 24 kL/h, this flow will need to increase if the flow to the UF return tank 38 is increased. Increase in flow to the UF return tank 38 will be due to increased back-flush duration, increased back-flush frequency, reduced UF plant recovery or increased UF feed flow rate.

UF Recirculation Flow
  Design: 250 kL/h
  Range: 0 kL/h to 500 kL/h (limited by UF recirculation pump)

The design recirculation flow rate is calculated to be 250 kL/h, but is actually limited by the maximum pressure drop (DP) of 150 kPa across the membranes. High recirculation flows are desirable, but the higher the flow, the higher the DP.

A high DP may result in the back end pressure of the UF membrane being lower than the permeate pressure, causing the permeate to reverse flow into the feed side of the membrane. The net effect of this is that the front end of the UF membrane is over-fluxed while the back end of the UF membrane has reverse flow (like continuous back-flush). This results in very poor membrane performance as the front end does all the work and quickly fouls.

Thus while high recirculation flow is desirable to scour the UF membrane surface, too high a recirculation flow is very detrimental. The optimum recirculation flow is the minimum rate that scours the membranes effectively. This parameter requires optimisation during commissioning.

UF Volumetric Recovery
  Design: 75% (70% to 85% variation)
  Range: 0% to 100%

UF recovery is the percentage of the UF feed flow that reports to the UF permeate. The UF plant 14 is designed to operate at a 75% recovery. Operating at higher recoveries will result in increased membrane cleaning requirements (increased back-flush frequency, increased back-flush duration and more frequent CIP treatment). While there is an optimum operating point, mechanically the plant is not limited below design recovery rate.

At 100% recovery the plant 14 is achieving maximum permeate flow from the available feed flow, and is ideally desirable. However, this is practically unachievable, as there is no bleed stream for the suspended solids that are being removed. The back-flush cycle then becomes the only time the captured solids are removed from the membranes and thus this back-flush frequency and duration are typically increased significantly such that overall throughput actually decreases.

While 100% recovery is theoretically possible if the suspended solids level is very low, it is unlikely that this operating point will be practicable with the feed fluid from most metal extraction processes.

UF Flux (Permeate Flow).
  Design: 33 LMH
  Range: 10 LMH to 40 LMH

The UF plant 14 design flux was based on pilot trials and a conservative LMH value was used. A clean water flux of 80 LMH is specified by the membrane manufacturer. The solids content in the feed fluid from the UF feed tank 30 and the age and condition of the UF membrane determines what flux is achievable. A flux not greater than 40 LMH is considered to be a practicable maximum with minimal increase in cleaning requirements. Operating at higher recoveries will result in increased membrane cleaning requirements (increased back-flush frequency, increased back-flush duration and more frequent CIP treatment). The maximum flux of the UF plant 14 far exceeds the maximum feed rate of the NF plant 16. In practise, the required UF flux is determined by what feed flow rate is required for NF plant 16 operation.

UF Back-Flush Pressure and Flow
  Design: 150 kL/h, 150 kPa
  Maximum: 350 kL/h, 300 kPa The design back-flush flow rate is 150 kL/h for UF membrane cleaning but is actually limited by the maximum trans-membrane pressure (TMP) of 300 kPa. This is a "hard" limit and exceeding this TMP parameter will likely result in UF membrane damage due to over-pressurisation resulting in collapse of the membrane capillaries.

NF plant

The design of the NF plant 16 was based on pilot trials with one significant design parameter being a 99% rejection of uranium in the recovered acid 20 at a temperature of about 35° C. While the selected NF membranes achieved this rejection criterion, they have a relatively low membrane life. Longer life membranes have a lower uranium rejection, hence were not selected initially.

In this embodiment the NF plant is configured in a tapered array with four stages in series. Each of stages 1, 2 and 3 has 4, 3 and 2 NF membrane housings in parallel, respectively, and the fourth stage has one NF membrane housing. Each of the stages is in a cross-flow configuration with the retentate of stage 4 being the retentate of the NF plant. The retentate of each of the prior stages is provided to the subsequent stage. The permeates of each stage are collected into a common header as the NF plant permeate. As a consequence of the series configuration of the stages, the acid concentration of the permeate in each stage varies. In this case the acid concentration of the permeate increases due to the fact that proportionally more water molecules than acid molecules permeate the NF membrane. This can allow for selection of different types of nanofilration membrane for each different stage. In particular, membranes that are more acid resistant can be selected for the higher acidity stages, even though it has been found that their uranium rejection is not as good as less acid resistant membranes. The type of membranes used in each stage in this configuration is the BMS Membranes ARU-24.

NF Plant Feed Flow
  Design: 30 kL/h (25.5 kL/h to 35 kL/h)
  Range: 20 kL/h to 40 kL/h The NF plant 16 design has a nominal feed flow rate of 30 kL/h and a design maximum of 35 kL/h. A maximum of 10 kL/h and a minimum of 4 kL/h feed flow is applied to a single NF membrane housing to ensure the maximum DP is not exceeded and a minimum cross-flow is maintained. The feed flow from the NF feed tank 36 should not be varied independently of the either the flux or recovery. The maximum feed flow of 40 kL/h requires a volumetric recovery of 83% to ensure the membrane pressure drop limits are not exceeded. If maximum feed flow is undertaken with too low a volumetric recovery, the tapered design of the membrane array will result in Stage 4 pressure drop across the membrane being exceeded (too much flow in and not enough permeate out). As membrane damage can occur with high pressure drops, the DP is monitored and will trip the NF pumps if the operating pressure set point is exceeded.

NF Plant Flux
  Design: 100% NF permeate flux (13/10/8/4 LMH for Stages 1 to 4 respectively)
  Range: 65% to 150% NF permeate flux (8/7/5/3 LMH to 20/15/12/6 LMH for Stage 1 to 4 respectively)

The NF plant 16 has been designed for a nominal flux of 13, 10, 8 and 4 LMH for Stages 1, 2, 3 and 4 respectively. However, these parameters can be adjusted as fluid conditions and plant requirements change. The flux of the NF plant 16 is adjusted as a whole without changing the ratio of the fluxes between the stages.

The flux is dependent on pressure being applied, feed flow, feed composition and volumetric recovery. Too high a flux can lead to membrane fouling and result in reduced flux. A balance between the flux, feed flow and volumetric recovery is required such that the maximum DP is not exceeded and a minimum feed flow of 4 kL/h to each membrane is maintained.

The flux is influenced by the composition of the feed stream from the NF feed tank 36. The more concentrated, the higher the osmotic pressure which will require a higher feed pressure to maintain flux. High flux is achievable with high feed rates (and operating pressure), while low flux is achieved with low feed rates (and low operating pressure). It is not possible to have high flux with low feed rates and vice versa.

NF Plant Volumetric Recovery
  Design: 70% (65% to 85%)
  Range: 55% to 85%

NF volumetric recovery is the percentage of the NF feed flow that reports to the NF permeate. The NF plant 16 volumetric recovery is a design parameter that is fixed by the tapering of the NF membrane array. The NF plant design has a single feed flow (from NF feed tank 36) and two outlet flows (clean acid stream 20 and a concentrated uranium stream 24). The volumetric recovery is limited due to both mechanical restrictions and feed flow.

Operating outside the volumetric recovery range results in exceeding the minimum and maximum flow range for the membrane housings negatively impacting the membranes integrity and performance.

NF Plant Acid Recovery
  Design: 63% (57% to 80%)
  Range: 48% to 80%

NF acid recovery is the percentage of acid in the NF feed flow that reports to the NF permeate. The NF plant 16 acid recovery is a function of the volumetric recovery and membrane performance.

Membrane performance is dependent on the membrane type, which can be optimised by using different membrane types.

NF Feed Pressure
  Design: 2,700 kPa
  Range: 1,500 to 7,000 kPa

The NF plant 16 design feed pressure is based on the osmotic pressure of the NF feed fluid (as quantified during pilot trials), NF membrane limitations and NF volumetric recovery. The osmotic pressure is dependent on the composition of the NF feed fluid. The feed pressure requirement is relatively independent of feed flow rate, though pressure losses due to flow do need to be taken into account.

It will be understood that various embodiments of the method for recovering an acid or base and the acid or base recovery apparatus of the present invention may have a number of advantages. Such advantages may include one or more of the following:

Less requirement for substances to neutralise the acid or base

Less requirement for acid or base reagents

Reduced loss of valuable uranium

Produces a more concentrated uranium stream

Reduces the required size of downstream process equipment.

It will be understood to persons skilled in the art of the invention that many modifications may be made without departing from the spirit and scope of the invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for recovering sulphuric acid or a base selected from sodium carbonate and/or sodium bicarbonate, and optionally sodium hydroxide, and dissolved uranium compound during a uranium extraction process, the method comprising:

subjecting a feed stream comprising the sulphuric acid or base and the dissolved uranium compound to a solids removal stage to extract detrimental solids therefrom, before contacting the feed stream with a cross-flow configuration ultrafiltration membrane plant to produce an ultrafiltration retentate and an ultrafiltration permeate; and feeding the ultrafiltration permeate directly from the ultrafiltration membrane plant to a nanofiltration feed tank and feeding the ultrafiltration permeate directly from the nanofiltration feed tank to a nanofiltration membrane plant configured in a tapered array to produce a concentrated nanofiltration retentate comprising a majority of the dissolved uranium compound from the feed stream, and a nanofiltration permeate comprising a majority of the sulphuric acid or base from the feed stream.

2. The method of claim 1, comprising re-using at least a portion of the sulphuric acid or base from the nanofiltration permeate in an upstream step of the uranium extraction process.

3. The method of claim 1, wherein the feed stream is an eluate.

4. The method of claim 3, wherein the eluate is formed by passing the sulphuric acid or base through a contactor containing the uranium.

5. The method of claim 4, wherein the sulphuric acid or base that is passed through the contactor onto which the uranium has been loaded comprises the sulphuric acid or base from the nanofiltration permeate.

6. The method of claim 1, further comprising flushing the ultrafiltration membrane plant and the nanofiltration membrane plant at intervals.

7. The method of claim 6, wherein the ultrafiltration membrane plant and the nanofiltration membrane plant are flushed using a membrane cleaning fluid.

8. The method of claim 1, wherein the ultrafiltration membrane plant comprises a plurality of ultrafiltration membranes in parallel, with the ultrafiltration membrane plant configured to receive a feed stream at a pressure in the range of 50 kPa to 700 kPa, at a temperature in the range of 30° C. to 50° C. and produce a flux in the range of 20 LMH to 40 LMH.

9. The method of claim 1, wherein the nanofiltration membrane plant is configured to receive a feed stream at a temperature in the range of 30° C. to 50° C. and each membrane of the nanofiltration membrane plant is configured to produce a flux in the range of 3 LMH to 20 LMH, operating at a membrane pressure drop of 10 kPa to 30 kPa.

10. The method of claim 9, wherein the tapered array configuration of the nanofiltration membrane plant is configured as four stages of membranes, being a first stage of membranes of the nanofiltration plant configured to operate with a flux of from 8 to 20 LMH, upstream from a second stage of membranes of the nanofiltration plant configured to operate with a flux of from 7 to 15 LHM, upstream from a third stage of membranes of the nanofiltration plant configured to operate with a flux of from 5 to 12 LHM, upstream from a fourth stage of membranes of the nanofiltration plant configured to operate with a flux of from 3 to 6 LHM.

11. The method of claim 1, wherein at least a portion of the ultrafiltration retentate is retained for use in an upstream step of the uranium extraction process.

12. The method of claim 1, wherein at least a portion of the ultrafiltration permeate is retained for use in an upstream step of the uranium extraction process.

13. The method of claim 12, wherein the at least a portion of the ultrafiltration permeate is directed back into the ultrafiltration membrane plant.

14. The method of claim 1, wherein the solids removal stage is a settler.

15. The method of claim 14, wherein the ultrafiltration retentate is recycled into the feed stream in the solids removal stage.

* * * * *